United States Patent
Muramatsu et al.

(10) Patent No.: US 9,166,417 B2
(45) Date of Patent: Oct. 20, 2015

(54) CHARGER

(71) Applicant: MAKITA CORPORATION, Anjo-shi, Aichi (JP)

(72) Inventors: Tomoo Muramatsu, Anjo (JP); Yasuhiro Tabuchi, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 196 days.

(21) Appl. No.: 13/958,792

(22) Filed: Aug. 5, 2013

(65) Prior Publication Data

US 2014/0055093 A1 Feb. 27, 2014

(30) Foreign Application Priority Data

Aug. 21, 2012 (JP) ................. 2012-182271
Aug. 21, 2012 (JP) ................. 2012-182275

(51) Int. Cl.
*H02J 7/00* (2006.01)

(52) U.S. Cl.
CPC ............. *H02J 7/0021* (2013.01); *H02J 7/0013* (2013.01)

(58) Field of Classification Search
CPC ........ H02J 7/0021; H02J 7/008; H02J 7/0047
USPC ........................................................ 320/112
See application file for complete search history.

(56) References Cited

U.S. PATENT DOCUMENTS

| | | | | |
|---|---|---|---|---|
| 4,081,739 | A * | 3/1978 | Gahler | 320/144 |
| 5,304,917 | A * | 4/1994 | Somerville | 320/148 |
| 5,903,131 | A * | 5/1999 | Sekine et al. | 320/106 |
| 6,329,793 | B1 * | 12/2001 | Bertness et al. | 320/132 |
| 6,856,047 | B2 * | 2/2005 | Murabayashi et al. | 307/150 |
| 7,365,514 | B2 * | 4/2008 | Tong | 320/110 |
| 7,719,234 | B2 * | 5/2010 | Carrier et al. | 320/135 |
| 7,816,886 | B2 * | 10/2010 | Brandon et al. | 320/110 |
| 7,956,575 | B2 * | 6/2011 | Kawano et al. | 320/113 |
| 2004/0070369 | A1 * | 4/2004 | Sakakibara | 320/128 |
| 2012/0306441 | A1 | 12/2012 | Brandon, II et al. | |

FOREIGN PATENT DOCUMENTS

| | | |
|---|---|---|
| CN | 101401276 A | 4/2009 |
| JP | A-5-207667 | 8/1993 |
| JP | A-2003-224933 | 8/2003 |

OTHER PUBLICATIONS

Feb. 25, 2015 Office Action issued in Chinese Patent Application No. 201310361903.8.

* cited by examiner

*Primary Examiner* — Sun Lin
(74) *Attorney, Agent, or Firm* — Oliff PLC

(57) ABSTRACT

A charger of the present invention includes a plurality of battery connection parts to which battery packs can be connected to charge, with each battery connection part having an indicator. The indicators can be configured such that when charging is expected to be completed more quickly in a first battery connection part compared to a second battery connection part, the indicator of the first battery connection part is displayed differently from the indicator of the second battery connection part.

4 Claims, 9 Drawing Sheets

CHARGER

This application claims priority to Japanese patent application Ser. No. 2012-182271 and Japanese patent application Ser. No. 2012-182275, the contents of which are incorporated herein by reference.

BACKGROUND OF THE INVENTION

1. Field of the Invention

The present invention relates to a charger that has a plurality of battery connection parts and is configured so as to be able to charge a battery pack by connecting the battery pack to each battery connection part.

2. Description of the Related Art

A charger of the related art is disclosed in Japanese Laid-Open Patent Publication No. H05-207667. The charger disclosed in Japanese Laid-Open Patent Publication No. H05-207667 is configured to include three sets of charging units, and each charging unit is configured to include a power supply part and two charging circuits. The power supply part can be connected to one of the two charging circuits by a switching means.

According to the above charging unit, when a first battery pack is being charged by a first charging circuit and a second battery pack is inserted into a second charging circuit, charging of the second battery pack will start only after the charging of the first battery pack is completed. After the first battery is charged, the switching means connects the second battery pack to the second charging circuit. Therefore, in the case where quick charging of the second battery pack is needed, it is preferable to connect the second battery pack to the second charging unit in which charging is not performed.

Further, a charger disclosed in Japanese Laid-Open Patent Publication No. 2003-224933 is configured to include a plurality of battery connection parts, and each battery connection part can be connected to a battery pack. Further, each battery connection part is configured to separately include an independent charging circuit. For this reason, should one of the battery connection parts breaks down, charging of the battery pack can be performed by use of a battery connection part that corresponds to another charging circuit.

SUMMARY OF THE INVENTION

In the charger disclosed in Japanese Laid-Open Patent Publication No. H05-207667, there is the situation where the operating time of a particular charging unit in the three sets of the charging units becomes long and thus the temperature of the electrical components of the particular charging unit increases compared to those of the other charging units. In such a situation, it is necessary to stop charging or limit the charging current until the temperature of the electrical components decreases.

Further, in the above-described charger, there is no means for showing the temperature increase of the electrical components. Thus, when a user connects the battery pack to the charging circuit, the user finds it difficult to judge which of the charging circuits of the charging units can quickly complete charging of the battery back.

In addition, in the charger disclosed in Japanese Laid-Open Patent Publication No. 2003-224933, each battery connection part includes a charging circuit and also separately includes an indication circuit for an indicator. Thus, when two indicators blink, synchronization of the timing of the blinking of the two indicators is difficult to accomplish. Further, when the two indicators blink out of synchronization, the user finds it difficult to judge whether the two indicators blink at the same frequency or at different frequencies.

Thus, there is a need in the art to enable a user to judge which of a plurality of battery connection parts in a charger can be expected to quickly complete charging of a battery pack, while display conditions of indicators are made to be more understandable for the user.

One construction for a charger can include a plurality of battery connection parts and is configured such that a battery pack can be charged by connecting the battery pack to the respective battery connection part. Further, each battery connection part includes an indicator, and in two or more of the battery connection parts, an indicator on a first battery connection part in which charging is expected to complete more quickly compared to a second battery connection part is displayed differently from an indicator on the second battery connection part.

According to this construction, a user can recognize the battery connection part in which charging of the battery pack is expected to complete relatively quickly.

According to another construction, when at least one battery pack is being charged by being connected to the battery connection part, the battery connection parts not connected to the battery connection part that is connected to the battery pack may have indicators. These indicators reveal which of the battery connection part(s) in which charging is expected to be able to be completed the quickest. The indicator on the battery connection part in which charging is expected to be completed the fastest may be displayed differently from the indicator in the other battery connection parts.

For this reason, even when at least one battery pack is being charged, the user can recognize a battery connection part in which charging of the battery pack is expected to complete relatively quickly.

According to another construction, the charger further includes a plurality of charging units, and each of the charging units includes two or more battery connection parts. Further, when a battery pack is not connected to all of the battery connection parts in a charging unit, the indicators are displayed such that charging is expected to be completed more quickly compared to a case where a battery is connected to one of the battery connection parts in another charging unit.

For this reason, by connecting the battery pack to the battery connection part in the charging unit in which all of the battery connection parts are in an empty state, (i.e. there is no battery pack is connected to the battery connection parts), it is possible to quickly complete the charging of battery pack.

According to another construction, a temperature detector that detects the temperatures of electrical components is provided in the respective charging unit. The indicator of the battery connection part in the charging unit in which the temperatures of the electrical components are lower than a predetermined value is displayed to reveal that charging is expected to be completed more quickly compared to the battery connection parts in the charging unit in which the temperatures of the electrical components exceed the predetermined value.

For this reason, it is possible to quickly perform charging of the battery pack by connecting the battery pack to the battery connection part of the charging unit in which the temperatures of the electrical components are lower than the predetermined value.

According to another construction, an indication state of a first indicator is different from that of other indicators by having a different blink frequency of an illuminant that comprises the indicator.

For this reason, it is possible to reduce manufacturing costs by using illuminants of the same color as their costs won't increase when compared to using illuminants of different colors.

According to another construction, one blink frequency is equal to the integral multiple of another blink frequency, and the timing of the start of the illumination of the indicators is configured to be the same.

For this reason, it is possible to clearly recognize the difference in the blink frequency of the indicators.

According to the above, a user can judge which of a plurality of battery connection parts in a charger can be expected to quickly complete charging of a battery pack, with display conditions of indicators being made to be more understandable.

DESCRIPTION OF THE PREFERRED EMBODIMENTS

Each of the additional features and teachings disclosed above and below may be utilized separately or in conjunction with other features and teachings to provide a charger. Representative examples of the present teaching, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

Hereinafter, a charger according to an example of the present invention will be described below with reference to FIG. 1 to FIG. 9. Here, forward and backward, leftward and rightward, and upward and downward in the diagram correspond to the forward and backward, the leftward and rightward, and the upward and downward of the charger.

The charger 10 is a device for charging a battery pack 60 used as a power supply of power tools, and may have four sets of battery connection parts 12 (A, B, C, and D) to which the battery pack 60 is configured to be connected. The four sets of battery connection parts 12 (A, B, C, and D) may be configured such that they are disposed parallel to a horizontal direction and that the battery pack 60 can be slidably connected from behind. The four sets of battery connection parts 12 (A, B, C, and D) have the same configuration, and thus only the battery connection part 12 (battery connection part A) will be described below as an example.

Figure 1:
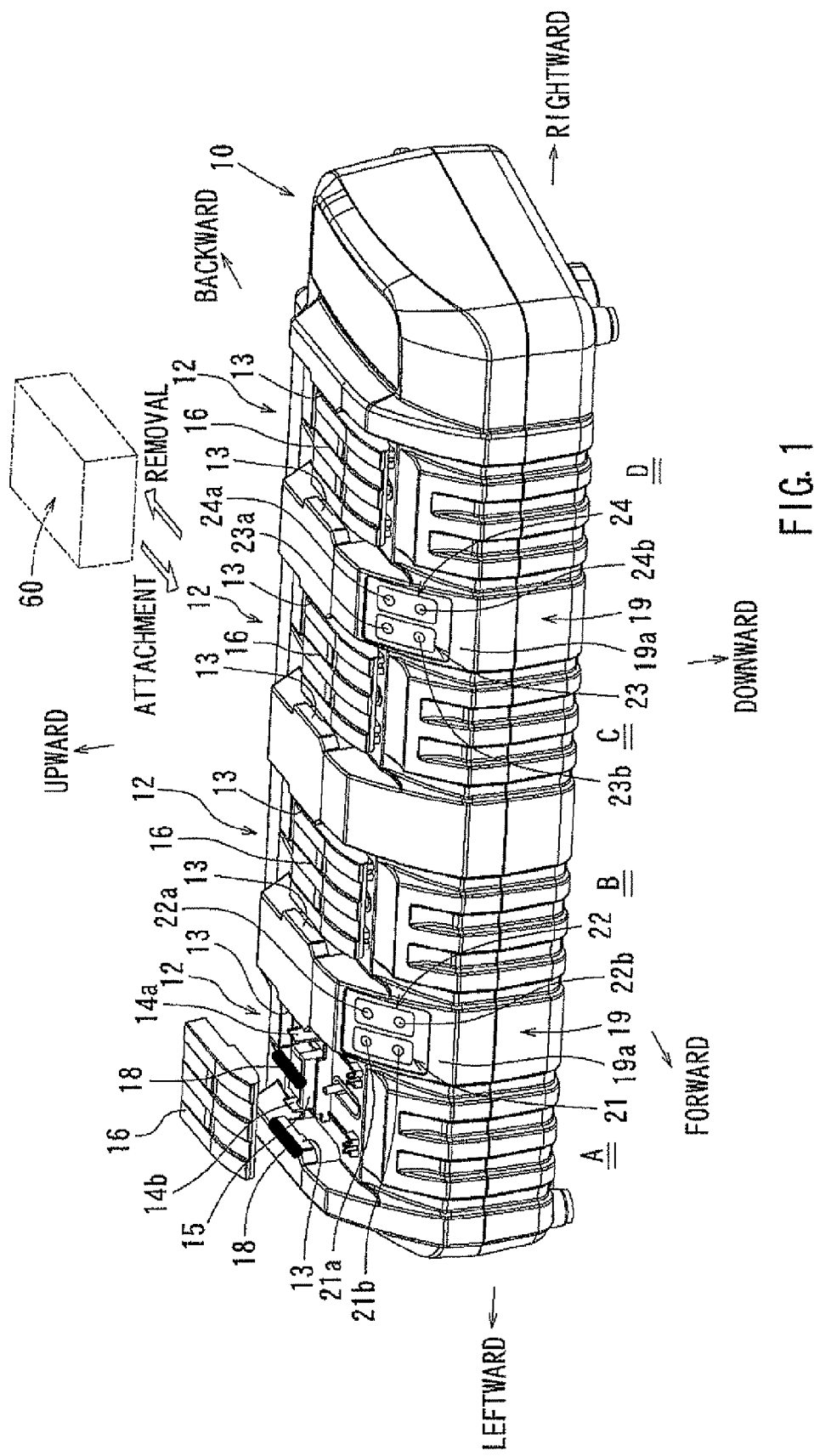
FIG. 1 is an overall perspective view of a charger according to an example of the present invention.

The battery connection part 12, as shown in FIG. 1, has receiving rails 13 extending in a back and forth direction on the left and right sides of a top surface of the battery connection part 12. In addition, positive-negative connection terminals 14a and 14b and a signal transmitting/receiving connector 15 are disposed between the left and right receiving rails 13. Further, a plate-shaped terminal cover 16 that covers the positive-negative connection terminals 14a and 14b as well as the signal transmitting/receiving connector 15 are provided between the left and right reception rails 13. The terminal cover 16 is configured to be slidable in the back and forth direction between the left and right receiving rails 13. It is held in a position covering the positive-negative connection terminals 14a and 14b and the signal transmitting/receiving connector 15 by use of spring force of a compression spring 18.

When the battery pack 60 is connected to the battery connection part 12, left and right slide rails (not shown) of the battery pack 60 are made to fit the left and right receiving rails 13 of the battery connection part 12, and then the battery pack 60 is slid from the rear side to the front side of the battery connection part 12. As a result, the terminal cover 16 of the battery connection part 12 is pushed by the battery pack 60, and slides forward (opening direction) against the spring force of the compression spring 18. Then, in the course of sliding of the battery pack 60 to a forward limit position, positive-negative connection terminals of the battery pack 60 and a connector (not shown) are respectively connected to the positive-negative connection terminals 14a and 14b and the signal transmitting/receiving connector 15 of the battery connection part 12.

As a result, the battery pack 60 and the battery connection part 12 of the charger 10 can be mechanically and electrically connected to each other.

A partition wall 19 may be formed between the battery connection part 12 on the left end (battery connection part A) and the adjacent battery connection part 12 (battery connection part B). A first indicator 21 and a second indicator 22 may be provided on a front inclined surface 19a of the partition wall 19. The first indicator 21 indicates a functioning state of the battery connection part A. It preferably has a green LED 21a disposed on the upper side and a red LED 21b disposed on the lower side. Likewise, the second indicator 22 indicates a functioning state of the battery connection part B, and has a green LED 22a on the upper side and a red LED 22b on the lower side.

Further, on the partition wall 19 between the battery connection part 12 (battery connection part C) and the battery connection part 12 (battery connection part D) disposed on the right end, a third indicator 23 and a fourth indicator 24 may be provided on the front inclined surface 19a. The third indicator 23 indicates a functioning state of the battery connection part C, and has a green LED 23a on the upper side and a red LED 23b on the lower side. The fourth indicator 24 indicates a functioning state of the battery connection part D, and has a green LED 24a on the upper side and a red LED 24b on the lower side.

Figure 2:
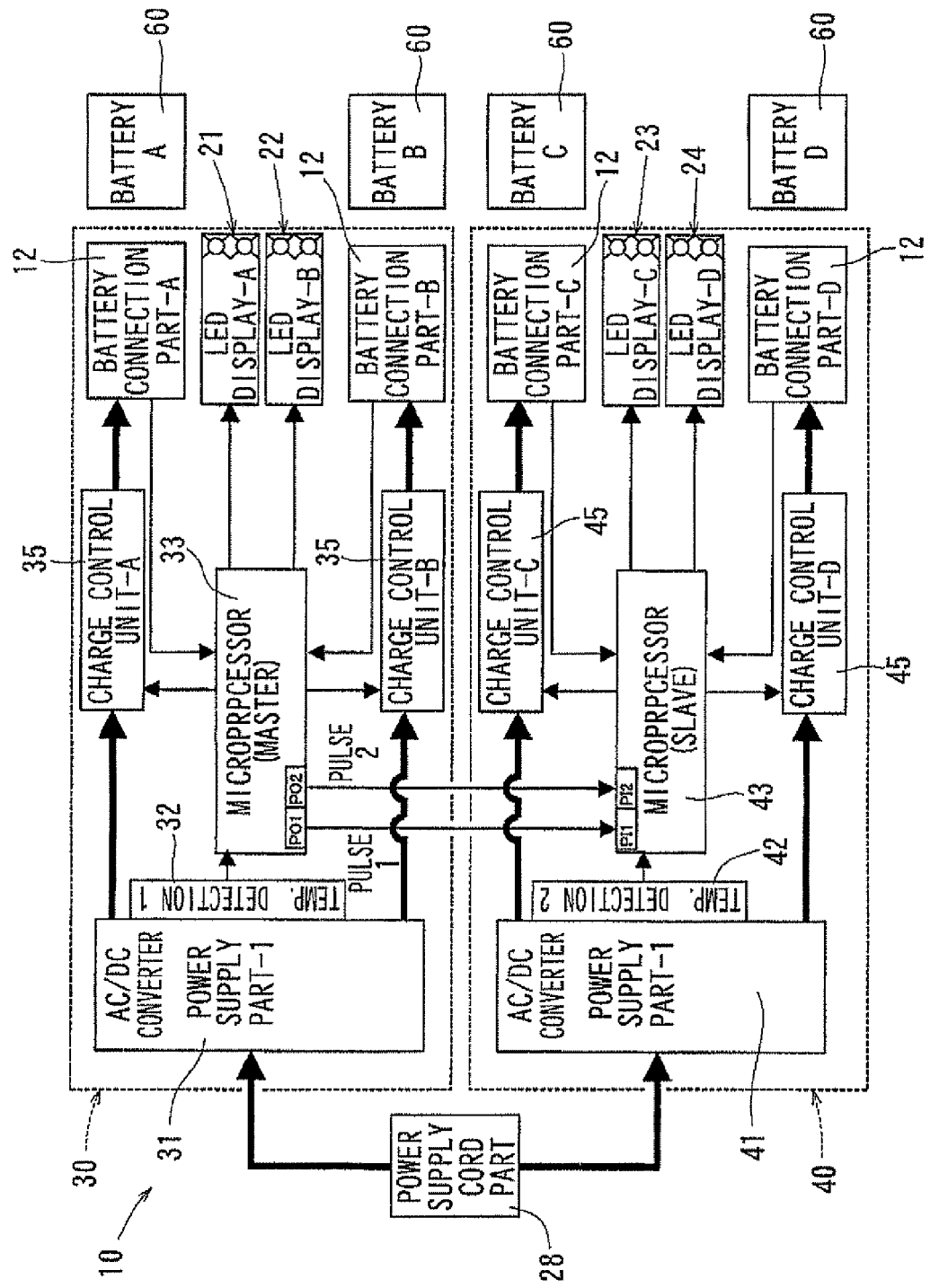
FIG. 2 is a block diagram of the charger according to the example.

As shown in FIG. 2, the charger 10 is configured to have a first charging unit 30 and a second charging unit 40.

The first charging unit 30 performs charging of the battery pack 60 connected to the battery connection part A and the battery connection part B, and preferably has a power supply part 31, a microprocessor 33, two sets of charge control units 35, a first indicator 21, and a second indicator 22.

Power supply part 31 may be configured so as to be able to convert AC power supply (for example, supplied from a household wall socket (not shown) via a power supply cord part 28) into DC power for charging. It is also preferably configured to provide DC power to the battery pack 60 connected to the battery connection part A and the battery connection part B. Further, a temperature sensor 32 for detecting the temperatures of electrical components (not shown) of the power supply part 31 is provided in the power supply part 31.

Here, as an example of the electrical components of the power supply part 31, it is preferable to use the components such as an FET, a diode, a transformer, a regulator, and the like, which can easily generate heat. With regard to the temperature sensor 32, monitoring can be performed in an analog manner by attaching a thermostat to the electrical parts. Further, by attaching a thermostat or the like to the electrical parts, temperature analysis to check whether the temperature is over a specified temperature or not can be performed.

A charge control unit 35(A) for controlling charging of the battery pack 60 may be connected to the battery connection part A. It is preferably configured so as to operate based on signals from the microprocessor 33. In the same manner, a charge control unit 35(B) for controlling the charging of the battery pack 60 may be connected to the battery connection part B, and may be configured so as to operate based on signals from the microprocessor 33.

The microprocessor 33 may be configured to be able to monitor connection state of the battery pack 60 with respect to the battery connection parts A and B and to output signals with respect to the first indicator 21 and the second indicator 22. When the battery pack 60 is connected to the battery connection part A or the battery connection part B, the microprocessor 33 may be configured to be able to control the charge control unit 35 based on the signals transmitted from the battery control circuit (not shown) of the battery pack 60. This can be based, for example, on battery temperature signals. Further, the microprocessor 33 is configured to be able to monitor the charging state of the battery pack 60 and output the signals to the first indicator 21 or the second indicator 22.

Figure 3:
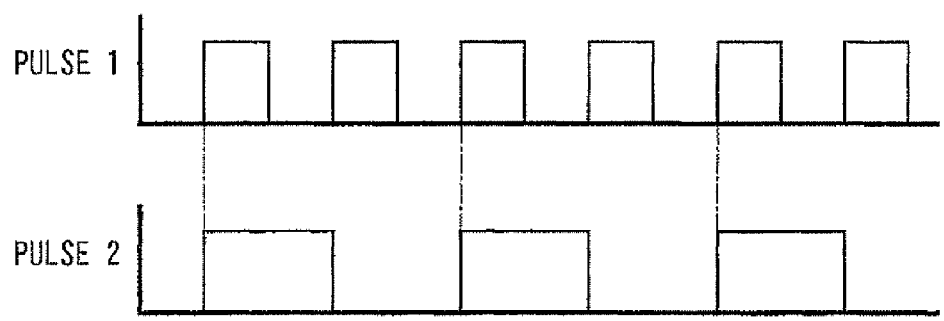
FIG. 3 is a timing diagram showing a pulse control to blink an indicator in the charger.

Further, as shown in FIG. 3, the microprocessor 33 may be configured to be able to transmit two types of pulse signals (pulse 1 and pulse 2) to a microprocessor 43 of the second charging unit 40. The pulse signals are used for blinking the red LEDs and the green LEDs of the indicators 21 to 24, which will be described later.

The second charging unit 40 is for performing charging of the battery pack 60 connected to the battery connection part C and the battery connection part D. It may have a power supply part 41, a microprocessor 43, two sets of charge control units 45, a third indicator 23, and a fourth indicator 24.

The microprocessor 43 of the second charging unit 40 may be configured so as to operate the indicators according to the pulse signals from the microprocessor 33 of the first charging unit 30. In addition, the power supply part 41, a temperature sensor 42, and the charge control units 45 of the second charging unit 40 may have the same configurations as those of the first charging unit 30.

The temperature sensors 32 and 42 of the first and second charging units 30 and 40 correspond to temperature detectors of this example of the present invention.

Figure 4:
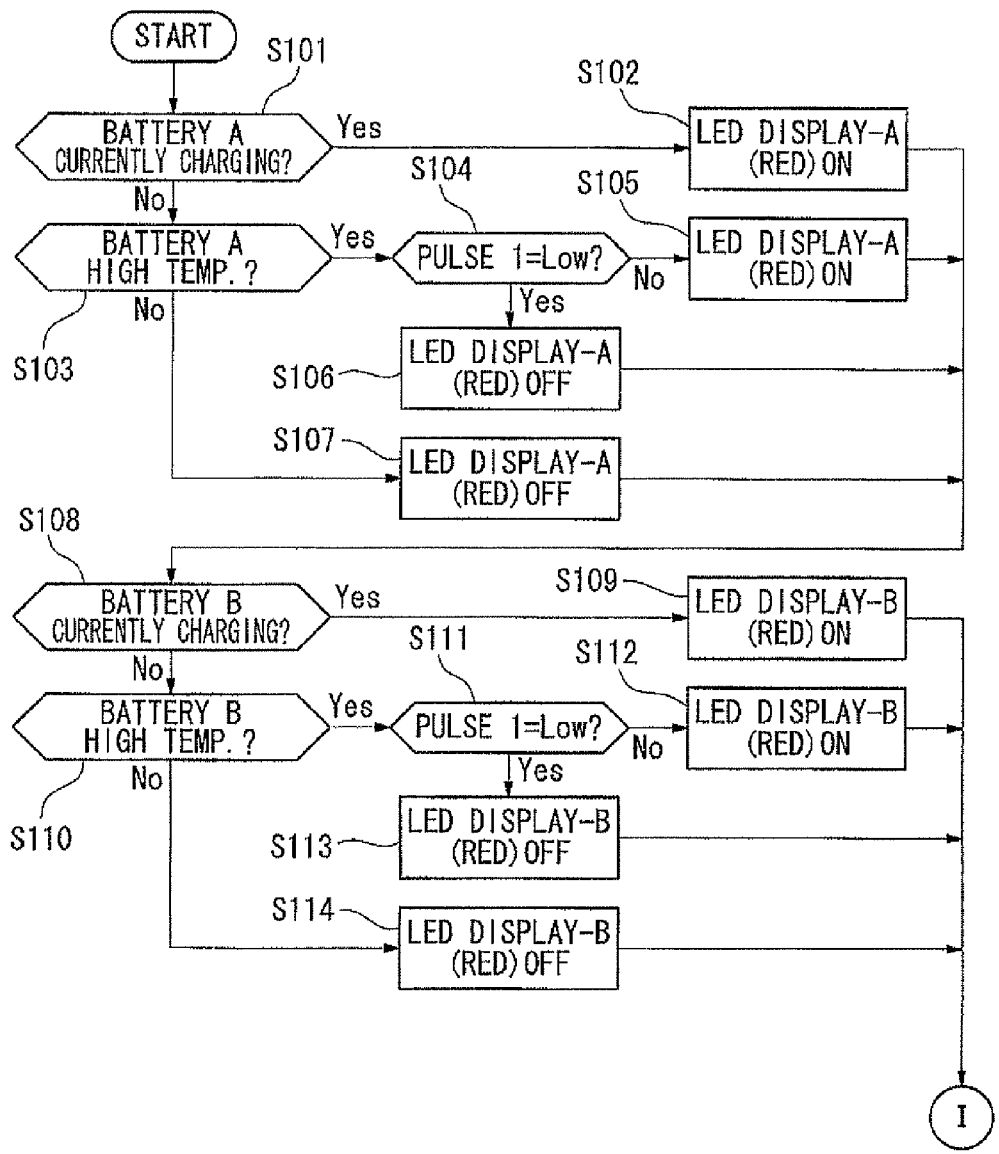
FIG. 4 is a flow chart showing a display behavior in the charger.
Figure 5:
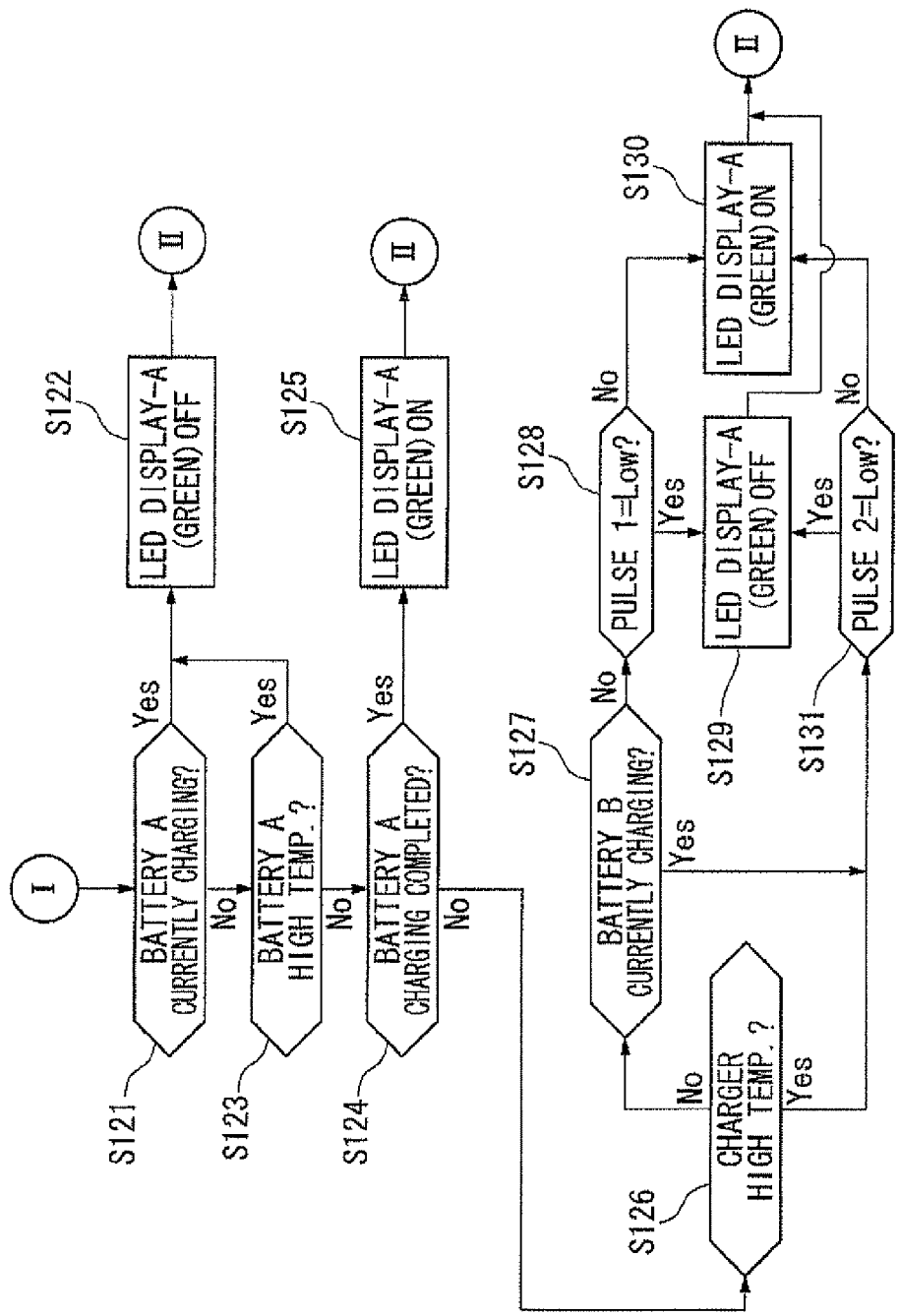
FIG. 5 is a flow chart showing the display behavior in the charger.
Figure 6:
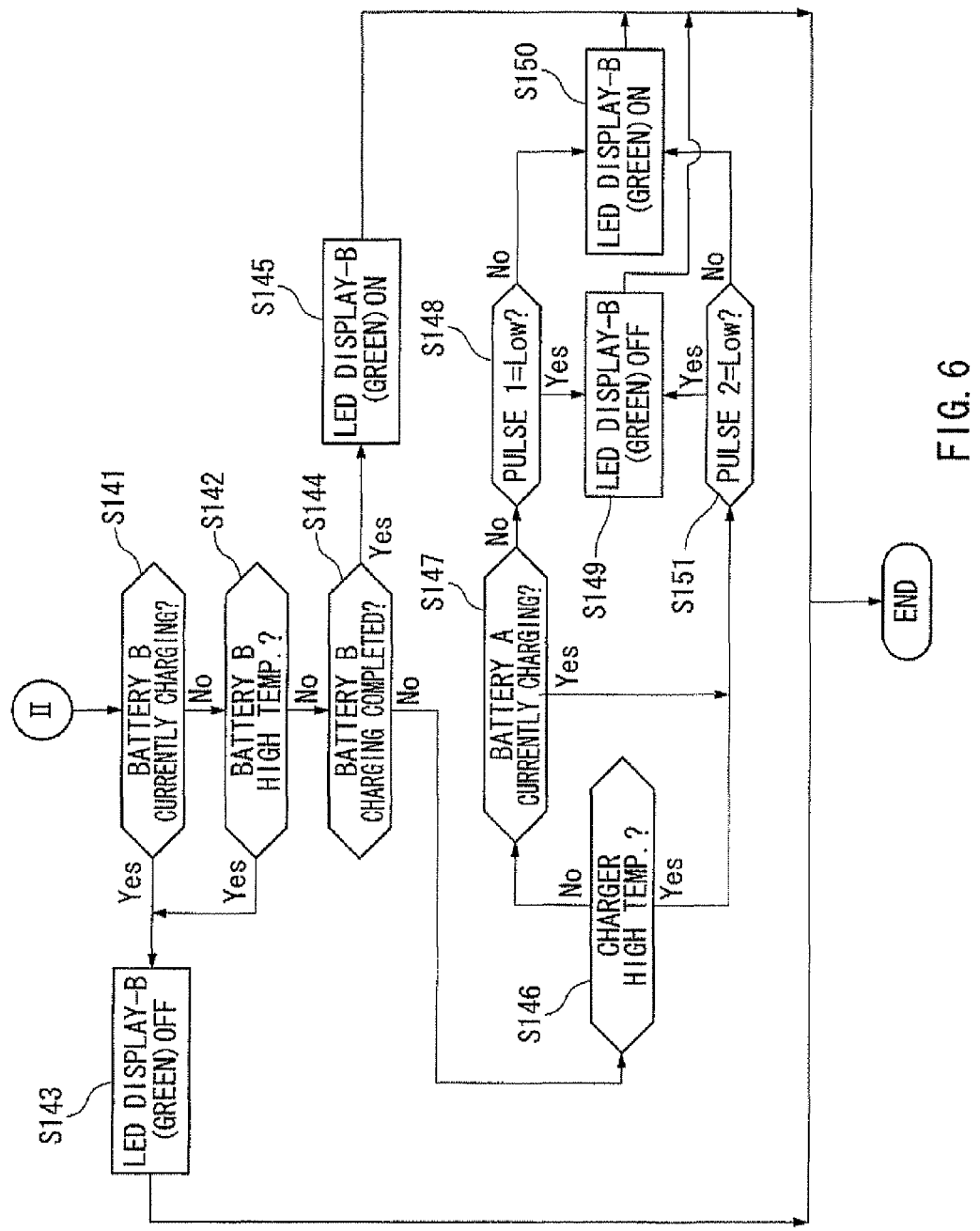
FIG. 6 is a flow chart showing the display behavior in the charger.
Figure 7:
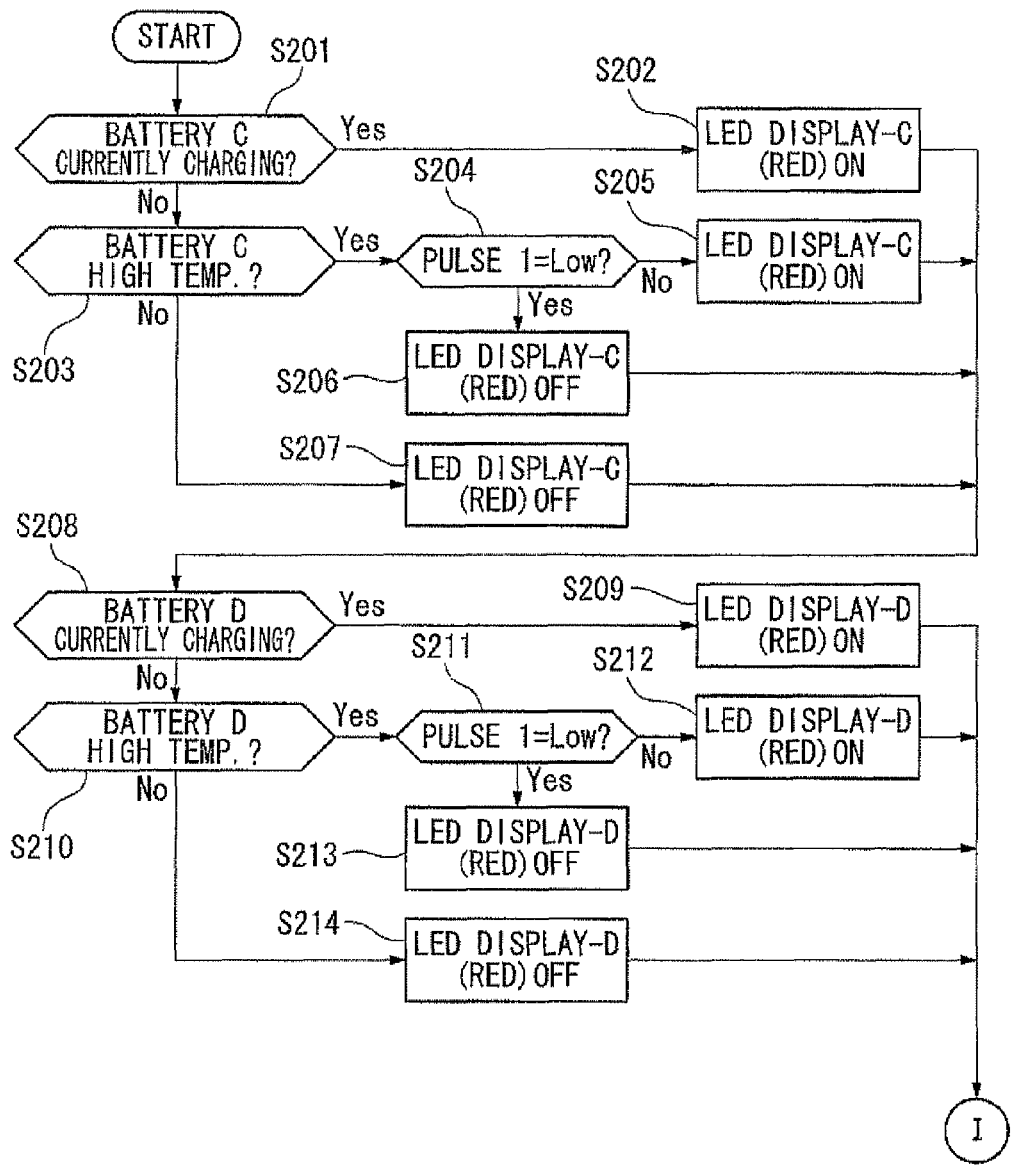
FIG. 7 is a flow chart showing the display behavior in the charger.
Figure 8:
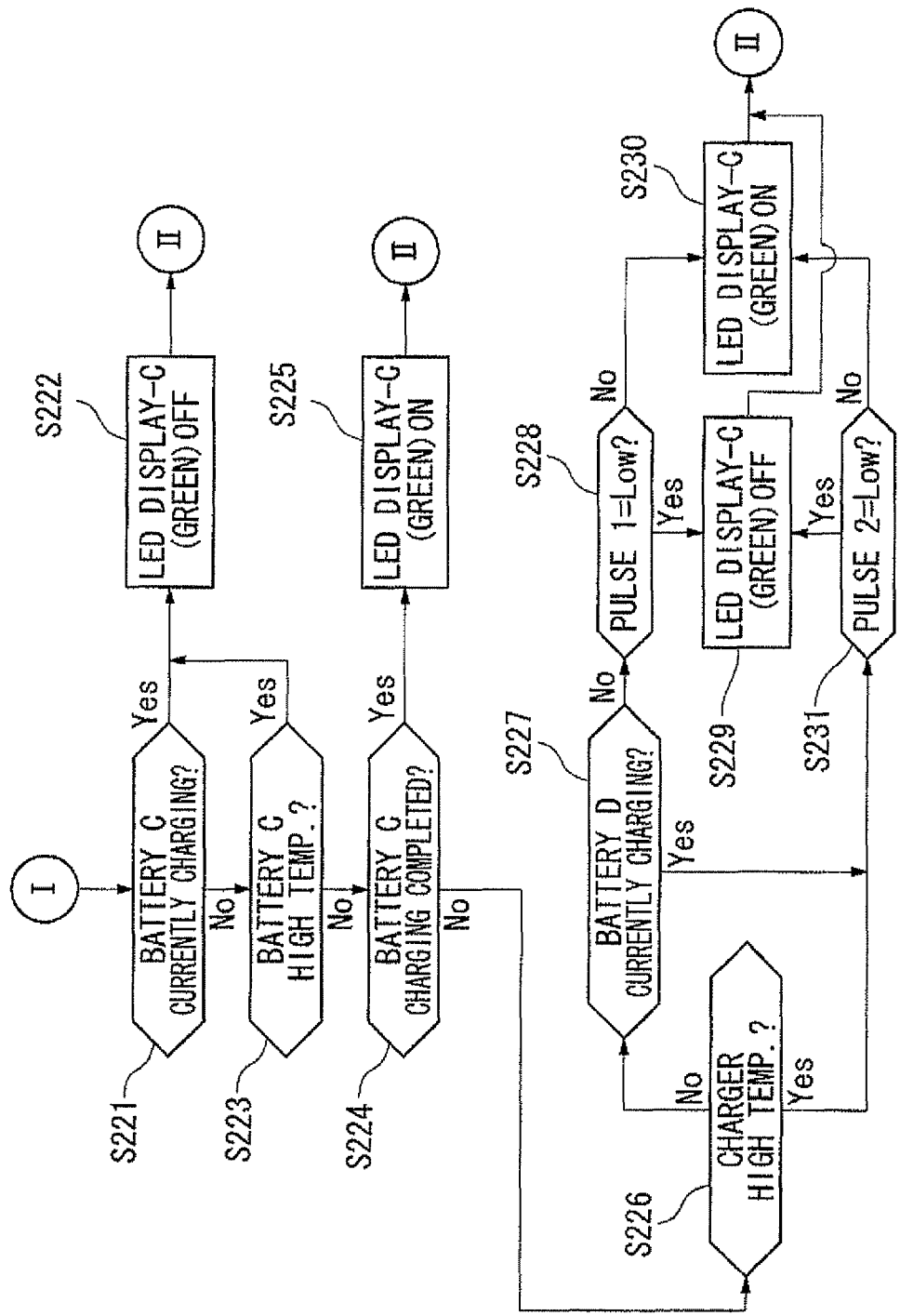
FIG. 8 is a flow chart showing the display behavior in the charger.
Figure 9:
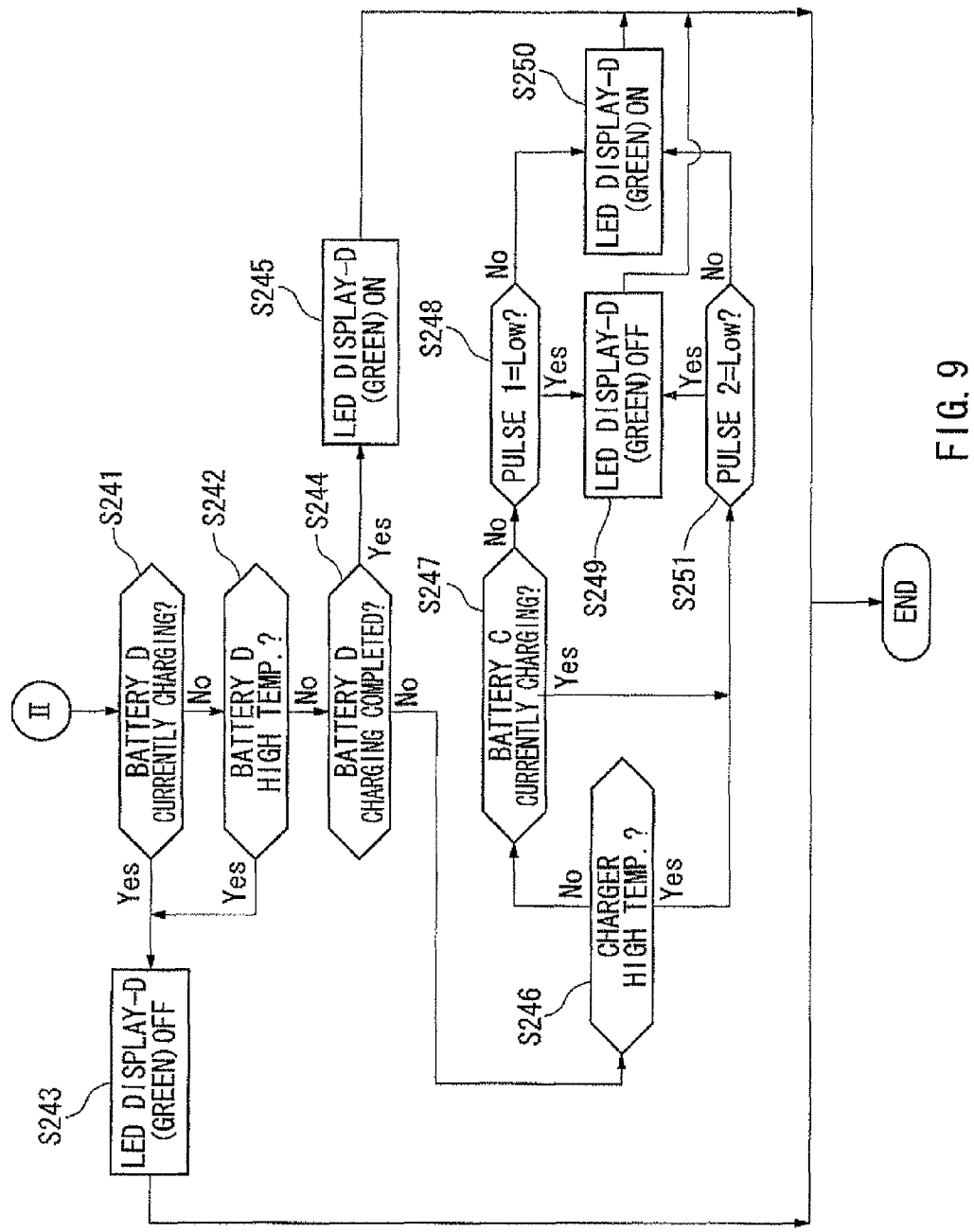
FIG. 9 is a flow chart showing the display behavior in the charger.

Next, behaviors of indicators 21 to 24 of the charger 10 will be described below with reference to the flow charts shown in FIG. 4 to FIG. 9. Here, procedures shown in FIG. 4 to FIG. 6 are performed based on a program stored in a memory of the microprocessor 33 of the first charging unit 30. The procedures shown in FIG. 7 to FIG. 9 are performed based on a program stored in a memory of the microprocessor 43 of the second charging unit 40.

First, behaviors of the indicators 21 to 24 will be described below in the situation where the battery pack 60 is connected to only the battery connection part A of the first charging unit 30. No battery pack is connected to the battery connection part B of the first charging unit 30 nor the battery connection part C and D of the second charging unit 40 (Hereinafter, referred to as an empty state). Moreover, the temperature of the electrical components of the battery pack 60 and the temperatures of the electrical components of the power supply parts 31 and 41 of the first charging unit 30 and the second charging unit 40 are assumed to be lower than a predetermined value.

When the battery pack 60 is connected to the battery connection part A of the first charging unit 30, charging of the battery pack 60 (A) may be performed. Accordingly, a judgment of a step S101 of FIG. 4 is YES, and in step S102, a red LED 21b of the indicator 21 of the battery connection part A lights up. In other words, by lighting up the red LED 21b of the indicator 21, it is possible to recognize that charging is being performed in the battery connection part A.

Next, in step S108, charging state of the battery connection part B is determined. That is, since the battery connection part B is in an empty state, the judgment of step S108 is NO, and in step S110, the judgment of the temperatures of the electrical components (e.g., cell of battery) of the battery pack 60 connected to the battery connection part B may be performed. Since the battery connection part B is in an empty state, the judgment of step S110 is NO. For this reason, in step S114, the red LED 22b of the indicator 22 in the battery connection part B is held in an OFF state.

Next, in step S121 of FIG. 5, the judgment as to whether or not the battery pack 60 is being charged in the battery connection part A is made. As described above, since the battery connection part A is in a charging state, in step S122, the green LED 21a of the indicator 21 in the battery connection part A is held in the OFF state.

Next, in step S141 of FIG. 6, the judgment as to whether or not the battery pack 60 is being charged in the battery connection part B is made. As described above, since the battery connection part B is in an empty state, the judgments of step S141, step S142, and step S144 are NO.

Then, in step S146, the judgment as to whether or not the electrical components of the power supply part 31 of the first charging unit 30 are at a high temperature is made. As described above, since the electrical components of the power supply part 31 of the first charging unit 30 are not at high temperatures (step S146 NO), a charging state of the battery connection part A is determined in step S147. Since the battery connection part A is in a charging state (step S147 YES), the green LED 22a of the indicator 22 of the battery connection part B blinks (step S149 and step S150) in step S151 based on slow pulses (pulse 2 of FIG. 3). In other words, when a voltage of the pulse 2 is zero (Low) (step S151 YES), the green LED 22a is turned off (step S149), and when the voltage of the pulse 2 is not zero (Low) (step S151 NO), the green LED 22a lights up (step S150).

Here, the blinking of the green LED 22a, which is based on the slow pulses, indicates a standby state of the battery connection part B. In other words, even when another battery pack 60 is connected to the battery connection part B, the blinking green LED indicates a standby state, and thus, only after the charging in the battery connection part A is completed, charging in the battery connection part B will start. For this reason, in the situation where another battery pack 60 is connected to the battery connection part B, it takes a relatively long time to complete charging in the battery connection part B.

Next, behaviors of the second charging unit 40 will be described below with reference to FIG. 7 to FIG. 9.

As described above, since the battery connection parts C and D of the second charging unit 40 are in an empty state, the judgments of step S201 and step S203 of FIG. 7 is NO, and in step S207, the red LED 23b (charging indication) of the indicator 23 of the battery connection part C is held in the OFF state.

In the same manner, the judgments of step S208 and step S210 are NO, and in step S214, the red LED 24b (charging indication) of the indicator 24 of the battery connection part D is held in the OFF state.

Next, the judgments of step S221, step S223, and step S224 of FIG. 8 are NO, and further, since the electrical components of the power supply part 41 of the second charging unit 40 are not at high temperatures, the judgment of Step S226 is NO. In addition, since charging is not performed in the battery connection part D (step S227 NO), the green LED 23a of the indicator 23 of the battery connection part C blinks based on fast pulses (pulse 1) in step S228, step S229, and step S230.

The fast blinking of the green LED 22a based on the fast pulses indicates a charge-ready state. In other words, the fast blinking of the green LED 22a indicates that if another battery pack 60 is connected to the battery connection part C, charging of the battery pack can be completed quickly.

Next, the judgments of step S241, step S242, and step S244 in FIG. 9 is NO, and further, the judgment of step S246 is NO. In addition, since charging is not performed in the battery connection part C (step S247 NO), the green LED 24a of the indicator 24 of the battery connection part D blinks based on the fast pulses (pulse 1) in step S248, step S249, and step S250. In other words, it is possible to recognize that the battery connection part D is in a charge-ready state.

Here, the microprocessor 43 of the second charging unit 40 receives two types of pulse signals (pulse 1 and pulse 2) from the microprocessor 33 of the first charging unit 30, as described above. For this reason, the slow blinking of the green LED 22a of the battery connection part B of the first charging unit 30 and the fast blinking of the green LEDs 23a and 24a of the battery connection parts C and D of the second charging unit 40 are synchronized in terms of their timing of illumination. This is shown in FIG. 3. For this reason, a user can clearly recognize a difference in a blink frequency. In this example, a frequency of the pulse 2 is set to be a half of a frequency of the pulse 1.

Therefore, when the user wants to charge another battery pack 60, the user can find that charging can be completed quickly by use of the battery connection part C or the battery connection part D of the second charging unit 40.

Then, when a predetermined charging time has passed and charging of the battery pack 60 in the battery connection part A of the first charging unit 30 is completed, the judgments of step S101 and step S103 of FIG. 4 are NO, and the red LED 21b (charging indication) of the indicator 21 in the battery connection part A is turned off (step S107).

Furthermore, since the judgments of step S108 and step S110 are NO, the red LED 21b (charging indication) of the indicator 21 of the battery connection part B is held in the OFF state, in step S114.

Next, since the judgments of step S121 and step S123 in FIG. 5 are NO, charging completion in the battery connection part A is checked, in step S124. As described above, since charging in the battery connection part A is completed (step S124 YES), the green LED 21a of the indicator 21 in the battery connection part A lights up (charging completion indication) (step S125).

Next, the judgments of step S141, step S142, step S144, and step S146 in FIG. 6 are NO, and since charging in the battery connection part A is completed, the judgment of step S147 is also NO. As a result, the green LED 22a of the indicator 22 in the battery connection part B blinks based on the fast pulses (pulse 1 of FIG. 3) in step S148, step S149, and step S150.

In other words, by the completion of the charging in the battery connection part A of the first charging unit 30, the battery connection part B is in a charge-ready state. That is, when another battery pack 60 is connected to the battery connection part B, charging will be completed quickly.

Next, behaviors of the indicators 21 to 24 will be described below in the situation where the electrical components of the battery pack 60 connected to the battery connection part A of the first charging unit 30 are at high temperatures. At this time, the battery connection part B is assumed to be in an empty state.

Since charging is not performed in the situation where the electrical components of the battery pack 60 are at high temperatures, the judgment of step S101 of FIG. 4 is NO, and in step S103, it is confirmed that the electrical components of the battery pack 60 are at high temperatures. Since the judgment of step S103 is YES, the red LED 21b of the indicator 21 in the battery connection part A blinks based on the fast pulses in step S104, step S105, and step S106 (battery high temperature indication).

As a result, since the electrical components of the battery pack 60 are at high temperatures, it can be recognized that charging is not being performed.

Further, the judgments of step S108 and step S110 are NO, and in step S114, the red LED 22b of the indicator 22 in the battery connection part B is held at the OFF state.

Next, since the judgment of step S121 in FIG. 5 is NO and the judgment of step S123 is YES, the green LED 21a of the indicator 21 in the battery connection part A is held at the OFF state (step S122).

Next, the judgments of step S141, step S142, and step S144 in FIG. 6 are NO, and further, the judgments of step S146 and step S147 are NO. For this reason, the green LED 22a of the indicator 22 in the battery connection part B blinks based on the fast pulses (pulse 1 of FIG. 3) in step S148, step S149, and step S150.

In other words, it can be recognized that the battery connection part B of the first charging unit 30 is in a charge-ready state.

Next, behaviors of the indicators 23 and 24 will be described below in a case where the electrical components of the power supply part 41 of the second charging unit 40 are at high temperatures. At this time, the battery connection parts C and D are assumed to be in an empty state.

The judgments of step S201 and step S203 of FIG. 7 are NO, and in step S207, the red LED 23b of the indicator 23 in the battery connection part C is held at the OFF state. Further, the judgments of step S208 and step S210 are NO, and in step S214, the red LED 24*b* of the indicator 24 in the battery connection part D is held at the OFF state.

Next, the judgments of step S221, step S223, and step S224 in FIG. 8 are NO, and in step S226, the judgment of whether the electrical components of the power supply part 41 of the second charging unit 40 are at high temperatures or not is made. Since the judgment of step S226 is YES, the green LED 23*a* of the indicator 23 in the battery connection part C blinks based on the slow pulses (pulse 2 of FIG. 3) in step S231, step S229, and step S230.

Further, the judgments of step S241, step S242, and step S244 in FIG. 9 are NO, and the judgment of step S246 is YES. Accordingly, the green LED 24*a* of the indicator 24 of the battery connection part D blinks based on the slow pulses (pulse 2 of FIG. 3) in step S251, step S249, and step S250.

That is, the second charging unit 40 is in a standby state by the time the temperatures of the electrical components of the power supply part 41 decreases. If the battery pack 60 is connected in this situation, the second charging unit 40 charges the battery pack while limiting heat generation by setting a charging current value to be lower than a normal charging current value. Thus, it can be recognized that it takes longer time to charge the battery pack.

According to the charger 10 of this example, the indicators 23 and 24 in the battery connection parts C and D, in which charging of the battery pack 60 is expected to be completed more quickly than a battery pack 60 connected to other battery connection parts (for example, B), are displayed differently from the indicator 22 in other battery connection part B. As a result, the user can connect the battery pack 60 to the battery connection parts C and D in which charging of the battery pack 60 is expected to be completed relatively quickly. Thus, the user can quickly complete charging of the battery pack 60.

Further, when at least one battery pack 60 is being charged, the user can find a battery connection part in which charging of the battery pack 60 is expected to be completed relatively quickly.

Further, the temperature sensors 32 and 42 that detect the temperatures of the electrical components are provided in the respective charging units 30 and 40. Thus, the indications of the indicators 21 to 24 of the battery connection parts A to D in the charging units 30 and 40 in which the temperatures of the electrical components are lower than a predetermined temperature value can show that charging is expected to be completed quickly. This expectation is in comparison to the battery connection parts A to D in the charging units 30 and 40 in which the temperatures of the electrical components exceed the predetermined temperature value.

Accordingly, it is possible to quickly perform charging by connecting the battery pack 60 to the battery connection parts A to D of the charging units 30 and 40 in which the temperatures of the electrical components are lower than the predetermined temperature value.

Further, the indicators 21 to 24 are displayed such that the blink frequency of illuminants or LEDs that comprise the indicators 21 to 24 are not the same. Thus, compared to the situation where the indicators are displayed such that different color LEDs are used, manufacturing cost can be reduced because the same LEDs are used.

Further, one blink frequency (pulse 1) is equal to the integral multiple (double) of the other blink frequency (pulse 2), and thus timing of the beginning of the illumination of the indicators becomes the same. Therefore, it is possible to clearly recognize the difference in the blink frequency.

Further, the charger 10 of the example of the present invention is configured such that the LEDs of the indicators 21 and 22 in the first charging unit 30 blink in synchronization with the LEDs of the indicators 23 and 24 in the second charging unit 40. For this reason, when the LEDs of the indicators 21 and 22 blink with a different blink frequency of the LEDs of the indicators 23 and 24, the user can easily find the difference between the LEDs of the indicators 21, 22 and the LEDs of the indicators 23, 23 in terms of blink frequencies. In addition, because of the synchronization of the indicators, the user does not mistake the same blink frequency for a different blink frequency when the LEDs blink with the same blink frequency. In this way, the present invention will make the indications of the indicators 21 to 24 more understandable.

Further, by transmitting synchronized pulses from the microprocessor 33 of the first charging unit 30 to the microprocessor 43 of the second charging unit 40, the timing of the illumination of the indicators 21 to 24 can be synchronized. Because of this, it is ensured that the indicators 21 and 22 of the charging unit 30 blink in synchronization with the indicators 23 and 24 of the charging unit 40.

Further, the blink frequencies of the indicators 21 to 24 are configured to be equal to the integral multiple of a predetermined blink frequency or the predetermined blink frequency divided by an integer. Thus, it is ensured that the indicators 21 and 22 of the charging unit 30 blink in synchronization with the indicators 23 and 24 of the charging unit 40, should the blink frequencies to be different from each other.

Further, since the microprocessor 33 of the first charging unit 30 is configured to transmit the synchronized pulses 1 and 2, the microprocessor 43 of the second charging unit 40 can easily control the blink frequencies of the indicators 23 and 24.

Here, the present invention is not limited to the above-described first embodiment, and can be modified without departing from the scope of the present invention.

In the above example of the present invention, the charger 10 may include the first charging unit 30 having the battery connection parts A and B and also may include the second charging unit 40 having a battery connection parts C and D. However, it is possible to apply the present invention to a charger having three or more sets of charging units, Further, it is also possible to apply the present invention to a charger that includes a charging unit having three or more battery connection parts.

Further, in the charger 10 according to the example of the present embodiment, the indicators 21 to 24 are displayed such that green LEDs blink based on slow pulses or fast pulses. However, it is also possible to display the indicators 21 to 24 differently such that the green LEDs blink based on pulses with an equal frequency or based on pulses with different pulse widths.

Further, the above example shows that the microprocessor 33 of the first charging unit 30 transmits two kinds of pulses 1 and 2 to the microprocessor 43 of the second charging unit 40. However, it is possible that the microprocessor 33 transmits three kinds of pulses.

Further, the above example shows that an ON time of the LEDs equals to an OFF time of the LEDs. However, it is possible that an ON time of the LEDs is different from an OFF time of the LEDs.

Further, in one example of the present invention, the charger 10 includes the first charging unit 30 and the second charging unit 40, and the microprocessor 33 of the first charging unit 30 which transmits the pulses 1 and 2 to the microprocessor 43 of the second charging unit 40. However, it is possible that a charger includes three or more sets of the charging unit, and a microprocessor of the first charging unit transmits a plurality of pulses to microprocessors of the second and the third charging units.

Further, the charger 10 in one example of the present embodiment may include the circuit that converts alternating currents (AC) into direct currents (DC) in the power supply parts 31 and 41. However, instead of this AC/DC conversion circuit, it is possible to include a DC/DC conversion circuit that converts direct currents obtained from a cigarette socket of a car, a solar cell, and a fuel cell etc., into direct currents for charging.

We claim:

1. A charger comprising a plurality of battery connection parts, the charger configured such that a battery pack can be charged by connecting the battery pack to respective one of the battery connection parts, wherein:
   each battery connection part includes an indicator;
   an indicator on a first battery connection part is displayed differently from an indicator on a second battery connection part when charging by use of the first battery connection part is expected to be completed more quickly than charging by use of the second battery connection part;
   at least one battery pack is being charged in a battery connection part; and
   among the battery connection parts not connected to the battery pack, an indicator on a battery connection part in which charging is expected to be completed more quickly than other battery connection parts is displayed differently from the indicators on the other battery connection parts.

2. A charger comprising a plurality of battery connection parts, the charger configured such that a battery pack can be charged by connecting the battery pack to respective one of the battery connection parts, wherein:
   each battery connection part includes an indicator;
   an indicator on a first battery connection part is displayed differently from an indicator on a second battery connection part when charging by use of the first battery connection part is expected to be completed more quickly than charging by use of the second battery connection part;
   the charger includes a plurality of charging units, each of the charging units having two or more battery connection parts; and
   when all of the battery connection parts in a charging unit are not connected to a battery, their indicators are displayed such that charging is expected to be completed more quickly as compared to a battery connection part in another charging unit which is connected to a battery.

3. The charger according to claim 2, wherein:
   a temperature detector that detects a temperature of electrical components is provided on the respective charging units; and
   the indicator of a battery connection part in a charging unit in which the temperatures of electrical components are lower than a predetermined value is displayed such that charging is expected to be completed more quickly as compared to a battery connection part in a charging unit in which the temperatures of the electrical components exceed the predetermined value.

4. A charger comprising a plurality of battery connection parts, the charger configured such that a battery pack can be charged by connecting the battery pack to respective one of the battery connection parts, wherein:
   each battery connection part includes an indicator;
   an indicator on a first battery connection part is displayed differently from an indicator on a second battery connection part when charging by use of the first battery battery connection part;
   an indication state of the indicator on the first battery connection part is different from that of the indicator on the second battery connection part by changing a blink frequency of an illuminant that is used in the indicators;
   one blink frequency of an indicator is equal to an integral multiple of a blink frequency of a different indicator; and
   timing of a start of an illumination of each indicator is configured to be the same for all of the indicators.

* * * * *